(12) United States Patent
Sakano (10) Patent No.: US 6,611,638 B2
(45) Date of Patent: Aug. 26, 2003

(54) HIGH PERFORMANCE OPTICAL ADD/DROP MULTIPLEXER AND OPTICAL WAVELENGTH MULTIPLEXING NETWORK

(75) Inventor: Shinji Sakano, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 09/942,539

(22) Filed: Aug. 30, 2001

(65) Prior Publication Data

US 2002/0094155 A1 Jul. 18, 2002

(51) Int. Cl.[7] ................................................. G02B 6/28
(52) U.S. Cl. ........................................................ 385/24
(58) Field of Search ............................. 385/24, 47, 34, 385/33, 46, 14, 37; 359/128, 124, 119, 127, 130

(56) References Cited

U.S. PATENT DOCUMENTS 6,198,857 B1 * 3/2001 Grasis et al. .................. 385/24
6,385,362 B1 * 5/2002 Norwood ...................... 385/14

FOREIGN PATENT DOCUMENTS

EP     001063803 A1 *  6/2000  ............ H04J/14/02

OTHER PUBLICATIONS

Prior Art titled "An Experiment on Optical Add–Drop Multiplexer Using Fiber Grating and It's Limiting Factor" described in the specification on p. 4.

\* cited by examiner

*Primary Examiner*—Jean Duverne
(74) *Attorney, Agent, or Firm*—Sofer & Haroun, LLP (57) ABSTRACT

In making use of an add/drop multiplexer for demultiplexing or multiplexing signal light of a few specific wavelengths from signal light subjected to optical wavelength multiplexing, a fiber bragg grating is excellent for enhancing rejection of a leakage of a demultiplexed light, but with respect to a high speed optical signal at the demultiplexing or multiplexing, a waveform deterioration occurs. When a dielectric multilayer film filter is used for dealing with the high speed optical signal, a plurality of filters are used to suppress a coherent cross talk, resulting in an increase of loss of pass-through light and an increase of costs.

For a filter portion of at least demultiplexing part, a dielectric multilayer film filter which is short in an optical path and free from deterioration of a high speed optical signal is used, and for demultiplexed light leakage rejecting part between the demultiplexing part and the multiplexing part, a fiber bragg grating which is low in loss of pass-through light, is low in cost and is excellent in the rejection characteristics of filter light is used.

3 Claims, 5 Drawing Sheets

HIGH PERFORMANCE OPTICAL ADD/DROP MULTIPLEXER AND OPTICAL WAVELENGTH MULTIPLEXING NETWORK

BACKGROUND OF THE INVENTION

The present invention relates to an optical wavelength multiplexing transmission of an optical fiber communication, and particularly to a constitution of an optical add/drop multiplexer used for an optical add/drop multiplexing section for carrying out communication between a plurality of nodes, a node constitution having an optical add/drop constitution, and an optical network.

In a long distance optical communication making use of an optical fiber, the transmission capacity by a single optical fiber was expanded rapidly by introduction of an optical wavelength multiplexing technique for placing independent signals on a plurality of different wavelengths in a single optical fiber. For example, by combining an optical fiber amplifier making use of the 1.5 $\mu$m band optical amplification characteristics of erbium doped fiber with the wavelength multiplexing technique, it becomes possible to place the rate of 10 Gbit/s on each wavelength to transmit 160 wavelengths for several hundreds km.

Further, recently, there has been introduced the optical add/drop multiplexing (separation and multiplexing) technique in which in the optical signal transmission between a plurality of spots, a common optical fiber transmission path is used to vary spots of traffic every wavelength of multiplexed signals, whereby optical signals are relayed and connected directly without converting them into electrical signals. The wavelength multiplexing technique and the signal optical add/drop multiplexing are combined whereby the communication between specific two spot nodes can be carried out every wavelength making use of the common optical fiber, thereby realizing the inexpensive optical transmission between many spots.

For demultiplexing from a multiplexed signal, roughly two methods have been employed. Generally, there are a method for separating all wavelengths, and a method for a single channel drop which takes out only a specific wavelength by a wavelength filter. For example, in the center node, electrical signals are taken out of all the optical signals and processed, and therefore, the former method which separates all the wavelengths is employed. However, in the local node which requires to separate only a few wavelength optical signals out of optical signals subjected to scores of or hundreds of wavelength multiplexing, it is not economical that all the wavelength signals are separated and multiplexed, and in a case of passing through a plurality of nodes, the shaping effect of a wavelength filter occurs. The shaping effect termed herein is a band narrowing effect in which even lowering of loss of 0.3 dB in the shape of a single filter, ten times of transmission result in loss of 0.3 dB, and the 3 dB band in total corresponds to a 0.3 dB band of a single filter. Since in the latter method, the constitution having the single drop combined is economical and the transmission wavelength signal is not taken out by a wavelength filter, there is no influence of the shaping effect of a wavelength filter; therefore the constitution was used at a spot for demultiplexing/multiplexing only a few wavelength optical signals.

For a single channel drop section, there is a method making use of a dielectric multilayer film filter comprising a construction having a plurality of dielectric layers having a great refractive index difference laminated and an optical fiber bragg grating filter comprising a construction in which an optical signal for transmitting an optical fiber delicately changes in refractive index. Light is reciprocal, and an optical channel of the single channel drop section is reversed to thereby constitute the single channel add section.

In the constitution of the wavelength add/drop making use of the dielectric multilayer film filter, a single channel drop filter is connected to an optical fiber subjected to wavelength multiplexing, only specific wavelength is separated and taken out, an optical signal of the other wavelength is let to pass through as it is to reach the single channel add filter of the same wavelength, and signal light of the same wavelength as the drop wavelength is multiplexed. The dielectric multilayer film filter performs demultiplexing and multiplexing with a thickness of a few wavelengths, and the filter constitution is a multilayer film so that excellent mass production is presented, but the rejection characteristics of demultiplexed/multiplexed light to the transmission path is not satisfactory in principle, which is about dozens of dB. The leakage light to the transmission path suffers several tens dB of loss in a subsequent filter, which is in total about 30 dB, producing a coherent cross of the demultiplexed/multiplexed signal and the optical signal. According to General Meeting SB-11-7 (p. 747) of The Institute of Electronics, Information and Communication Engineers in 1996, the coherent cross talk requires rejection of about 38 dB or more. Normally, in a system using the single wavelength add/drop multiplexing, there are many ring constitutions via a plurality of nodes or long distance transmissions via a plurality of nodes, accumulation of grain differences between wavelengths by repeating of relay becomes large. Referring to specific wavelength signals, as the leakage characteristics of the demultiplexing section, a light level is sometimes higher than an average determined value, and since the multiplexed optical level has an optical level independently thereof, the rejection characteristics as high as grain differences are further required to prevent the coherent cross talk. Conventionally, to improve the rejection characteristics, there is employed a method for inserting a further filter between the drop filter and the add filter to enhance the rejection characteristics, but an increase in pass-through loss of transmission light or an increase in cost are brought forth.

In the constitution of the wavelength add/drop multiplexing making use of a fiber bragg grating filter, the fiber bragg grating is a reflection reversing type filter in which light reversibly moves in the same optical fiber as the moving-in channel as described in General Meeting SB-11-7 (p. 747) of The Institute of Electronics, Information and Communication Engineers in 1996, and therefore, and it was necessary to make use of a circulator for taking out the demultiplexed light or multiplexing insert light. In the circulator, three input positions and output positions can be separated according to the light traveling direction, and thereby the reverse-traveling light can be output not to the incident fiber but the demultiplexed light taking out fiber. The fiber bragg grating is excellent in wavelength selectivity, and leakage of demultiplexed light to the transmission channel is rejected not less than 40 dB. However, the manufacturing process of the fiber bragg grating is easy and the cost is low, but a circulator which is complex in construction and has less effect of mass production is required, and so, the price is high to obtain the add/drop multiplexing function. Further, recently, higher modulation speed of an optical signal and higher density wavelength multiplexing are progressed, and the constitution of a system for multiplexing the rate of 10 Gbit/s at 100 GHz intervals or 50 GHz intervals has been studied.

We have obtained from our studies that in the fiber bragg grating, a great program as noted below occurs. When a spacing between wavelengths is narrow, a filter band of the fiber bragg grating becomes narrow, and it is necessary to make small a change in refractive index forming a grating, for example, it is necessary to lower it to about 5×10 for 100 GHz spacing. To obtaine high rejection characteristics in that state, it is necessary to have a longer reflection area because a reflection coefficient in an area lowers by a portion that the change in refractive index lowers, for example, it is necessary to have not less than 10 mm in the above-described example. However, in a case where a digital signal of 10 Gbit/s is input, a spatial dispersion occurs due to the reflection from the incident end of the grating and the reflection from a deep point of a reflection area. For example, when the length of the practical fiber bragg grating is 10 mm, a delay caused by the spatial dispersion of 60 ps occurs, thus posing a problem that also as a NRZ signal, waveform deterioration is brought forth with respect to the pulse width of 100 ps.

SUMMARY OF THE INVENTION

Objects to be achieved by the present invention are to prevent a coherent cross talk, which is required in an optical add/drop multiplexer, and to avoid a spatial dispersion at the time of add/drop multiplexing of a high speed modulation signal. Further the above objects are to be realized while making a loss of a pass-through signal low and reducing costs.

To suppress wavelength deterioration resulting from demultiplexing/multiplexing of a high speed modulation signal in an optical wavelength multiplexing system whose wavelength spacing is narrow and occurrence of a coherent cross talk with a low cost, a filter for demultiplexing/multiplexing a specific wavelength from a multiplexed optical signal is used, a filter comprising a dielectric multilayer film is used for a filter for multiplexing a specific wavelength to the other transmission optical signal is used, and a fiber bragg grating filter is used as a rejection filter for rejecting a leakage of demultiplexed optical signal into a transmission path.

A dielectric multilayer film filter is short, a few $\mu$m, in a multiplexing reflective area, and can be demultiplexed or multiplexed without bringing forth deterioration of waveform. Further, in the present constitution, by combining with a dielectric multilayer film filter, an optical circulator need not be used, and the high rejection characteristics of 40 dB is obtained with respect to rejection light signal by making use of the fact that the cost of the fiber bragg grating itself is low and that the loss is low with respect to transmitted light.

Since transmission rejection signal light is returned in the form of reflection reversal from the fiber bragg grating used for rejection, it is feared that the returning light is leaked into the demultiplexing end. Normally, the transmission rejection signal is passed through the dielectric multilayer film filter twice to damp not less than 20 dB, and reflection from a connector of the input fiber is not more than 20 dB, thus posing a problem. Otherwise, an optical isolator is inserted to reject the reflection reversing light from the fiber bragg grating filter, thereby removing the leakage light.

In general, for a filter for demultiplexing a specific wavelength from a multiplexed optical signal, when an optical signal having a specific wavelength demultiplexed to the other passing-through optical signal remains, a coherent cross talk occurs when the constitution for multiplexing an optical signal having a specific wavelength continues later, but with the present constitution, the coherent cross talk can be avoided by powerfully rejecting the leaking light having a specific wavelength.

By suppressing the wavelength deterioration of the demultiplexed light and the multiplexed light to suppress a coherent cross talk of the demultiplexed light and the multiplexed light low, and using an optical signal add/drop multiplexer making a loss of transmission light low, an optical network of high quality of signal and of low cost can be realized.

DESCRIPTION OF THE PREFERRED EMBODIMENT

Figure 1:
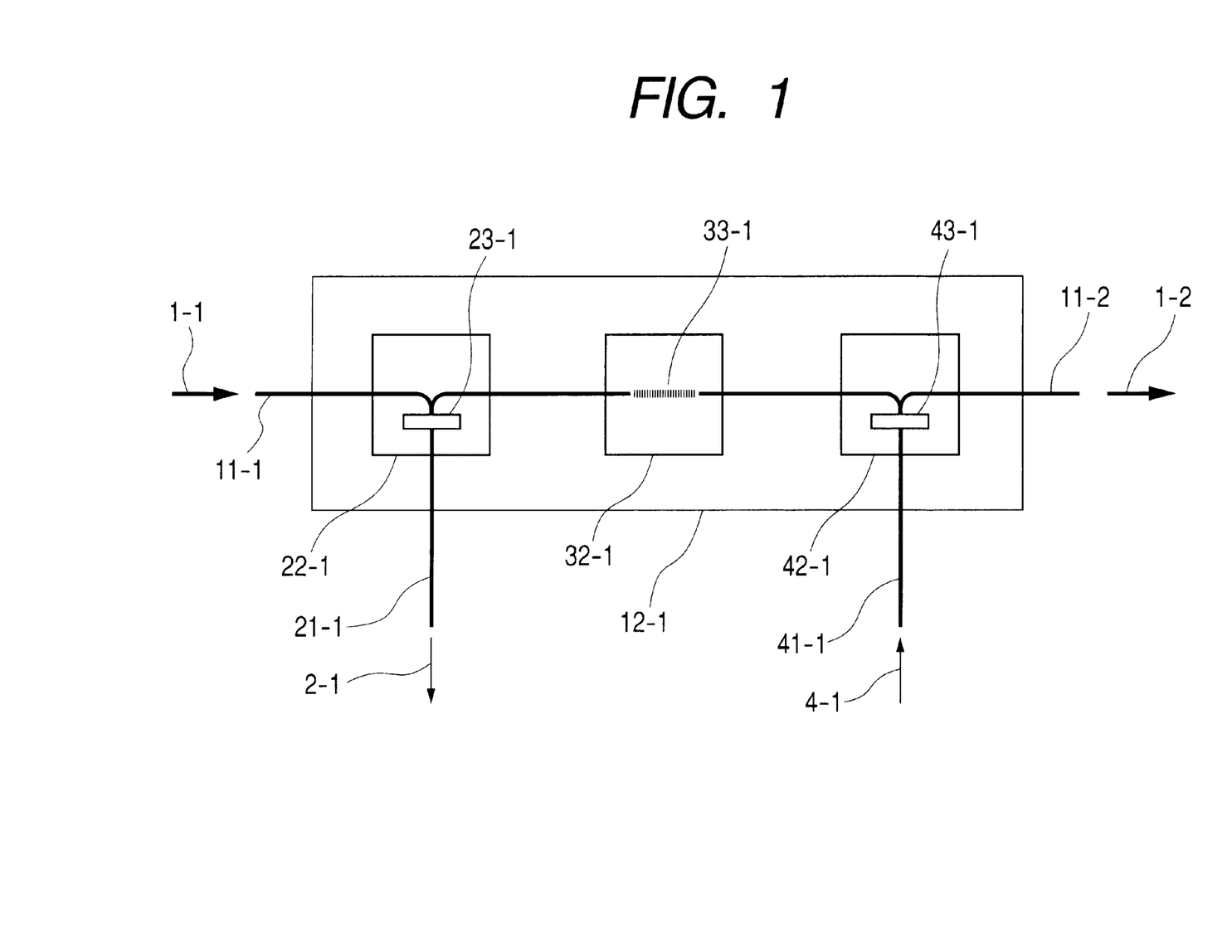
FIG. 1 is a constitutional view of a signal optical add/drop multiplexer having a dielectric multiplexing film filter corresponding to a single wavelength in a demultiplexing part and a multiplexing part and a fiber bragg grating in a demultiplexed light leakage rejection part.

One embodiment is shown in FIG. 1. An optical signal 1-1 having 16 wavelengths subjected to optical wavelength multiplexing at intervals of 0.8 nm (100 GHz) from 1547.72 nm to 1559.79 nm of a wavelength area is incident through an incident fiber 11-7 of an optical channel add/drop multiplexer 12-1. An optical drop unit (a wavelength demultiplexer) 22-1 comprises a dielectric multilayer film filter 23-1, and signal light 2-1 having a specific wavelength, for example, a wavelength of the fifth 1550.92 nm is emitted through a demultiplexing end optical fiber 21-1. In the drawing, the constitution of a transmission type multilayer film filter is employed, but a filter constitution in which demultiplexed light is reflected may be also employed, in which case, the demultiplexing end optical fiber 21-1 is connected on the reflective side. The loss of the demultiplexed light having the wavelength of the fifth 1550.92 nm is 1.2 dB at the maximum, and the loss to the pass-through end is 10 dB at the minimum. Other wavelength signal light having passed through a optical drop unit (wavelength demultiplexer) 22-1, that is, signal light other than wavelength of the fifth 1550.92 nm and leakage light of wavelength of the demultiplexed light 1550.92 nm are incident on a demultiplexed light leakage rejection part 32-1. A demultiplexed light leakage rejection filter comprises a fiber bragg grating 33-1 for reflecting signal light having a wavelength of 1550.92. The loss of pass-through light other than the wavelength of 1550.92 nm is 0.5 dB at the maximum, and the loss of rejection light, that is, signal light of wavelength of 1550.92 nm is not less than 40 dB. Other wavelength signal light other than the wavelength of 1550.92 nm having passed through the demultiplexed light leakage rejection part 32-1 reaches a optical add unit (multiplexer) 42-1. Here, insert signal light 4-1 of separate wavelength of 1550.92 nm having the same wavelength as the demultiplexed light is incident through an incident end optical fiber 41-1 and is multiplexed into pass-through other wavelength signal light through an inserting multiplexing filter 43-1. The multiplexing filter 43-1 comprises a dielectric multilayer film filter having the thickness of a few $\mu$m. Therefore, even in the high speed modulation of 10 Gbit/s, distribution delay time due to spatial dispersion by the dielectric multilayer film filter is about 0.1 ps, and the waveform deterioration rarely occurs from the pulse width of 0.1 ns of 10 Gbit/s. The insert loss of insert signal light is 1.2 dB at the maximum, the loss of a pass-through signal light of other wavelengths other than a wavelength of 1550.92 nm is 0.8 dB at the maximum, and signal light 12 multiplexed emits through an emitting optical fiber 11-2. Further, The loss of the previous leakage rejection light is 10 dB at the minimum. While the multiplexed part is shown as the pass-through type similar to the demultiplexing part, it may be of a reflection type.

The pass-through loss of the other wavelength signal light is suppressed to 2.1 dB at the maximum, and the leakage to be an interference turbulence to the multiplexed light of the demultiplexed light can be damped to not less than 50 dB. Even in a case where the gain difference between wavelengths of a wavelength multiplexed signal via a plurality of nodes of 16-wavelength at intervals of 0.8 nm (100 GHz) from 1547.72 nm to 1559.79 of the wavelength area is 10 dB, it is possible to suppress to not less than 48 dB necessary for maintaining a level of suppressing a leakage optical coherent cross talk of 38 dB to be a pass penality free. If the penality not more than 0.5 dB is permitted, the rejection characteristics of 40 dB will suffice as a design value of the constitution in which a substantial coherent cross talk is 30 dB.

In a method of superposing a plurality of dielectric multilayer films to improve the rejection characteristics of leakage light, the shape of a filter is round as compared with the fiber bragg grating. Therefore, the wavelength dependence of the loss characteristic of the demultiplexed light or the loss characteristic of the insert light is great so that in the arrangement at wavelength intervals of 0.8 nm, the loss was enlarged with a slight deviation of wavelength.

In general, a permissible wavelength deviation of ±1.5 nm is necessary, but the wavelength width to that degree failed to have. On the other hand, a fiber bragg grating was used which has a band of ±1.5 nm for the rejection of leakage light by making use of only the demultiplexing or multiplexing characteristics for the dielectric multilayer film.

With respect to the rejection of leakage light, in the aforementioned embodiment, the dielectric multilayer film of the multiplexing part also distributes to the shield of the leakage of demultiplexed light for avoiding a coherent cross talk, but substantially, the sufficient shield effect is obtained by the dielectric multiplayer film of the demultiplexing/multiplexing part and the fiber bragg grating. In other words, the function and constitution of the present invention is realized by the dielectric multilayer film filter for rejecting not less than 10 dB of the demultiplexed light and the fiber bragg grating filter for rejecting the leakage light not less than 30 dB.

Figure 2:
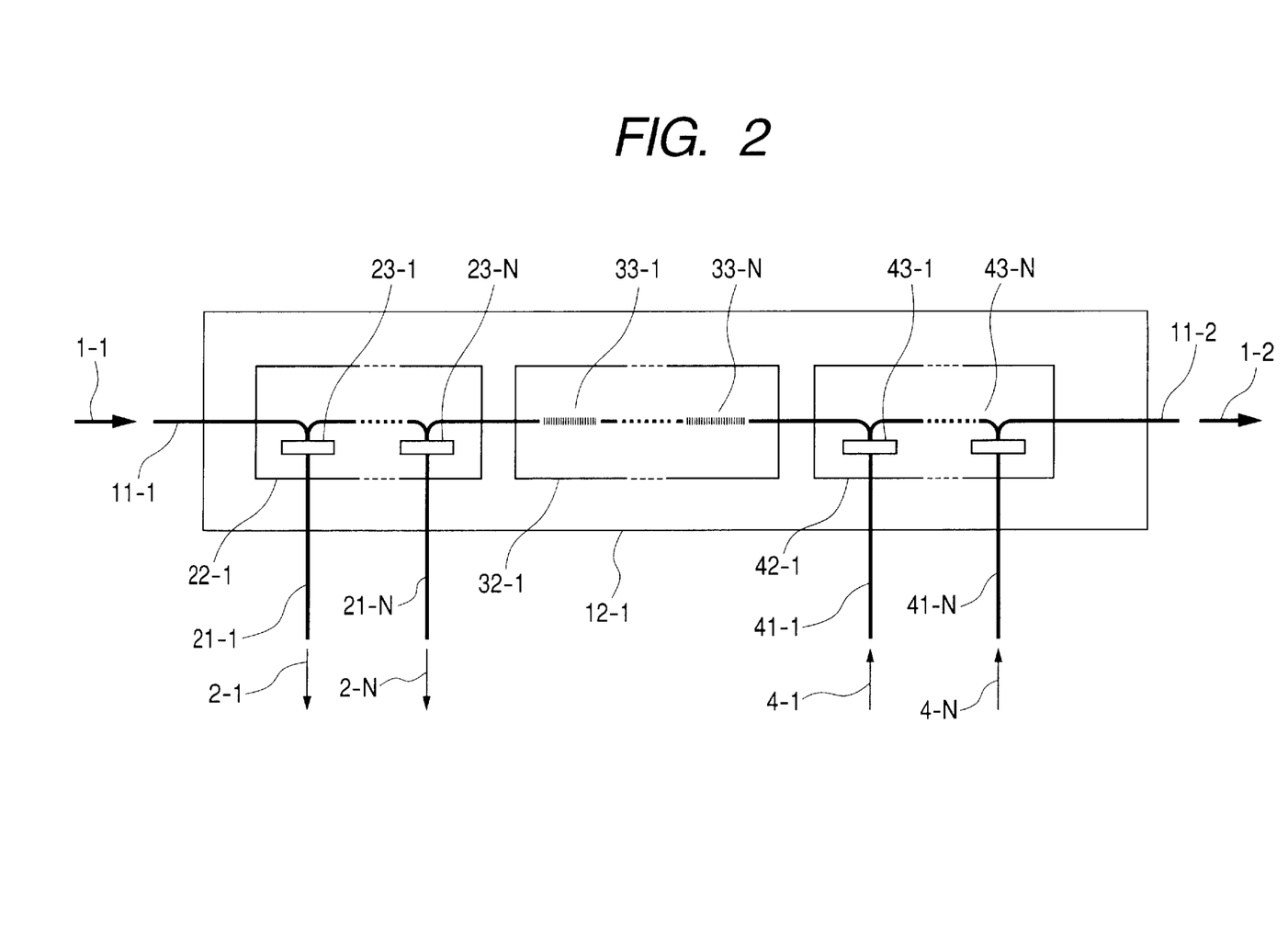
FIG. 2 is a constitutional view of a signal optical add/drop multiplexer having a dielectric multiplexing film filter corresponding to the N-number of wavelength in a demultiplexing part and a multiplexing part and a fiber bragg grating in a demultiplexed light leakage rejection part.

A further embodiment is shown in FIG. 2. While in the previous embodiment, the demultiplexing/multiplexing for one wavelength has been shown, in this embodiment, the demultiplexing/multiplexing for a plurality of wavelengths is shown. An optical signal 1-1 subjected to wavelength multiplexing is incident through an incident fiber 11-1 of an optical channel add/drop multiplexer 12-1. A optical drop unit (wavelength demultiplexer) 22-1 comprises a dielectric multilayer film filter 23-1 for demultiplexing a first wavelength through a dielectric multilayer film filter 23-N for demultiplexing the N-number of wavelengths, and signal light 2-1 to 2-N of a demultiplexed specific wavelength are emitted through a demultiplexing end optical fiber 21-1. The first to Nth wavelengths may take a suitable combination of wavelengths. While in the drawing, a constitution of a transmission type multiplexing film filter is shown, a filter constitution in which demultiplexed light is reflective may be employed. At that time, demultiplexing end optical fibers 21-1 to 21-N are connected on the reflection side. At that time, the loss of the demultiplexed light to the demultiplexing end is 1.2 dB at the maximum for a first waveguide, and about 0.8 dB*N+1.2 dB at the maximum for the Nth wavelength. The loss of each demultiplexed light leakage to the pass-through end is 10 dB at the minimum. Other wavelength signal light having passed through the optical drop unit (wavelength demultiplexer) 22-1 and the leakage light of the demultiplexed light are incident on a demultiplexed light leakage rejection part 32-1. A demultiplexed light leakage rejection filter comprises fiber bragg gratings 33-1 to 33-N having the rejection characteristics corresponding to each wavelength. The loss of pass-through light is 0.5 dB at the maximum, and the loss of each leakage rejection light is not less than 40 dB. Other wavelength signal light having passed through the demultiplexed light leakage rejection part 32-1 reaches a optical add unit (multiplexer) 42-1. Here, insert signal light 4-1 to 4-N having the same wavelength as the demultiplexed light are incident through incident end optical fibers 41-1 to 41-N, and are multiplexed into pass-through other wavelength signal light through inserting multiplexing filters 43-1 to 43-N. The inserting multiplexing filters 43-1 to 43-N of respective wavelengths comprise dielectric multilayer film filters whose thickness is a few $\mu$m. Therefore, even in the high speed modulation of 10 Gbit/s, waveform deterioration rarely occurs. The insert loss of wavelength receiving the minimum loss of the insert signal light is 1.2 dB at the maximum, and the insert loss of wavelength receiving the maximum loss is (0.8*N+1.2) dB at the maximum. The loss of other wavelength pass-through signal light is 0.8 dB*N at the maximum, and the multiplexed signal light 1-2 is emitted through the emitting optical fiber 11-2. The leakage loss of the previous demultiplexed light is 10 dB at the minimum. While the multiplexing part shown is of the transmission type similar to the demultiplexing part, the reflective type may be employed.

From the foregoing, the pass-through loss of the other wavelength signal light is suppressed to (0.8 dB*2*N+0.5) dB at the maximum, and the leakage to be interference turbulence of the demultiplexed light to the insert signal can be damped to not less than 50 dB. Even if the gain difference between wavelengths of a wavelength multiplexed signal is 10 dB, it can be suppressed to not more than 48 dB necessary for maintaining a permissible level of a coherent cross talk of 38 dB.

Figure 3:
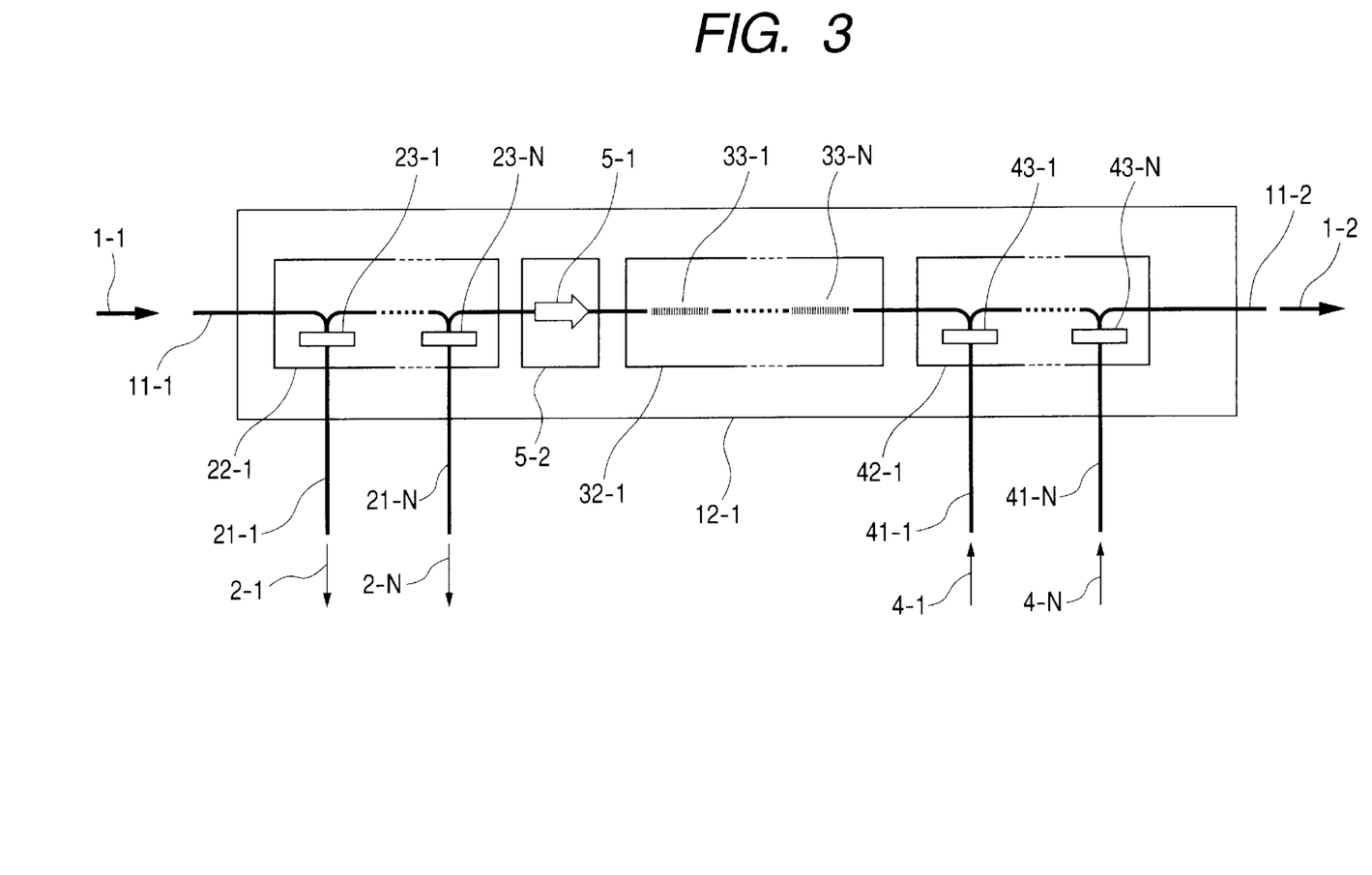
FIG. 3 is a constitutional view of a signal optical add/drop multiplexer having an optical isolator for blocking reverese-traveling of rejection light from a fiber bragg grating.

FIG. 3 shows a constitution in which arrangement is made such that turbulence does not occur due to the leakage of the reflective reversing light into the demultiplexed length at the rejection of the demultiplexed light in the embodiment shown in FIG. 2. Other wavelength signal light having passed through a optical drop unit (wavelength demultiplexer) 22-1 and the leakage light of the demultiplexed light are incident on a demultiplexed light leakage rejection part 32-1. A demultiplexed light leakage rejection filter comprises fiber bragg gratings 33-1 to 33-N having the rejection characteristics corresponding to each wavelength. The loss of the pass-through light is 0.5 dB at the maximum, and the loss of each rejection light is not less than 40 dB. Now, in the fiber bragg grating, the rejected light reverse-travels in channel and tries to return to the incident light fiber 11-1. By inserting the reverse-traveling light rejection part 5-2 with respect to the reflective reverse-traveling light, the reverse-traveling light can be lowered not less than 30 dB in intensity. The reverse-traveling light rejection part comprises an optical isolator 5-1, and the loss in the forward direction is about 0.5 dB, which poses no problem. By inserting the reverse-traveling light rejection part, the leakage of the demultiplexed light of the demultiplexing filters 23-1 to 23-N to the passage can be relieved, and thereby the productivity when the number of wavelengths is increased can be achieved, thus enabling reduction of costs.

Figure 4:
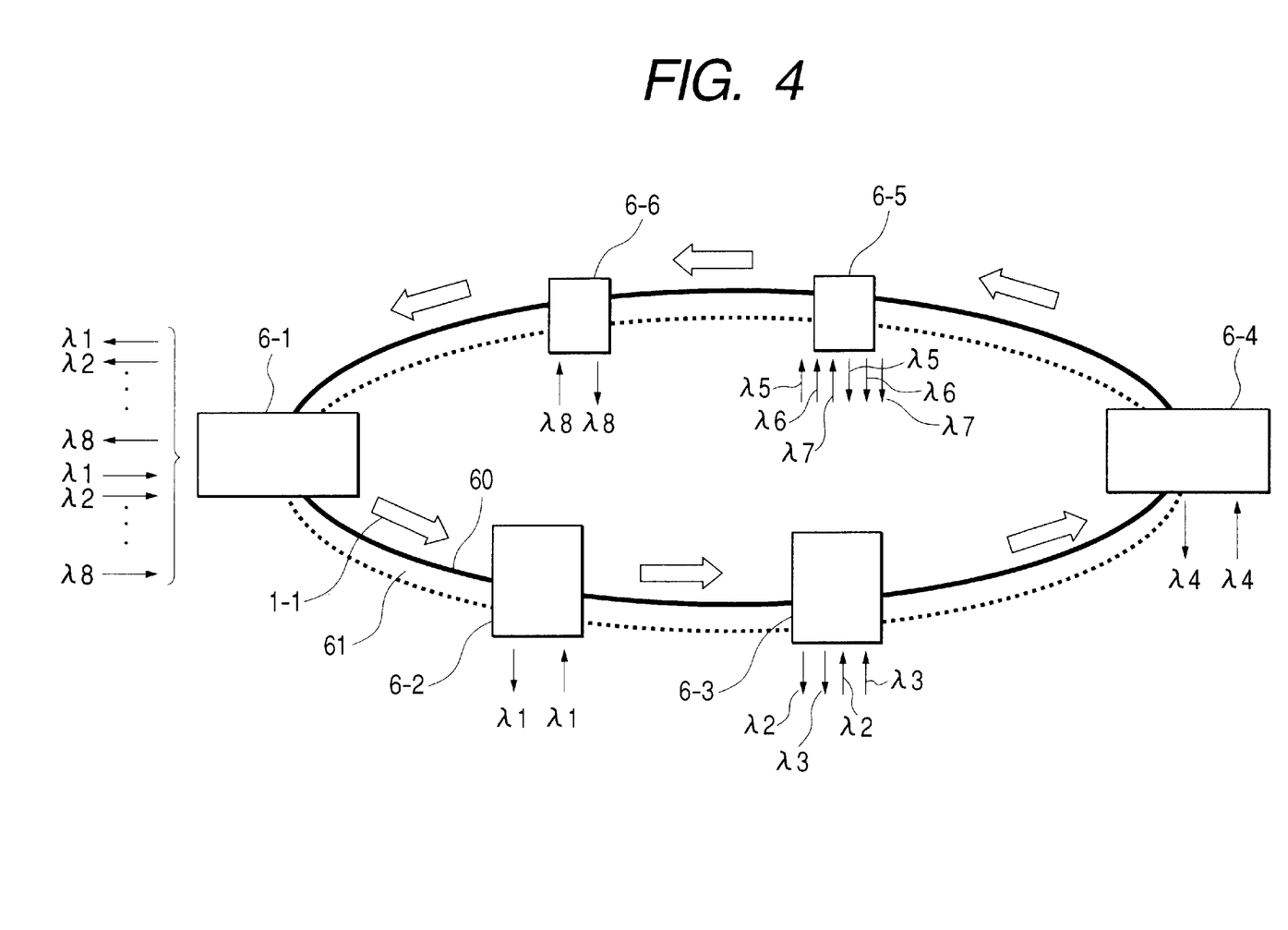
FIG. 4 is a constitutional view of an optical ring network system having wavelength deterioration at the time of the low optical signal demultiplexing, and optical signal demultiplexing/multiplexing of high demultiplexed light leakage rejection.

FIG. 4 shows a constitutional example of an optical ring network system having, in a local node, an optical signal add/drop multiplexer for the waveform deterioration at the low signal demultiplexing/multiplexing and the rejection of leakage of high demultiplexed light. The ring comprises an optical fiber transmission path 60 for propagating a signal counterclockwise and an optical fiber 61 for propagating it clockwise. An optical signal along the optical fiber transmission path 60 will be described, but is constituted of similar function in the optical fiber transmission path 61.

In a center node 6-1, all the wavelength signals $\lambda 1$ to $\lambda 8$ are inserted. An optical signal 1-1 subjected to optical wavelength multiplexing demultiplexes an optical signal from the center node of the single wavelength $\lambda 1$ at the first local node 6-2, and inserts the transmission optical signal $\lambda 1$ to the center node. At this time, the dielectric multilayer film filter corresponding to the single wavelength in the first embodiment is used in the demultiplexing part and the multiplexing part, and the fiber bragg grating is used for the demultiplexed light leakage rejection, whereby even in the signal of the rate of 10 Gbit/s, the waveform deterioration caused by a filter rarely occurs, and high quality of transmission without being affected by the coherent cross talk can be maintained. In carrying out demultiplexing/multiplexing signal light of two wavelengths $\lambda 2$ to $\lambda 3$ of N=2 at the second local node 6-3, signal light of a single wavelength $\lambda 4$ at the third local node 6-4, signal light of three wavelengths $\lambda 5$, $\lambda 6$, and $\lambda 7$ at the fourth local node 6-5, and signal light of the single wavelength $\lambda 8$ at the fifth local node 6-6, respectively, a signal optical add/drop multiplexer using a dielectric multilayer film filter corresponding to single wavelength or N wavelength and a fiber bragg grating for rejection of demultiplexed light leakage is used to thereby construct an optical network system maintaining high signal quality. Further, the signal light of wavelength $\lambda 8$ from the center node passes through four nodes until it is demultiplexed at the local node 6-6, during which gain differences are accumulated. A high optical level of 4 dB may be achieved, but since the rejection of leakage of demultiplexed light in the add/drop multiplexer is available up to about 50 dB, a leakage light level becomes far low than a permissible interference level of 38 dB.

Figure 5:
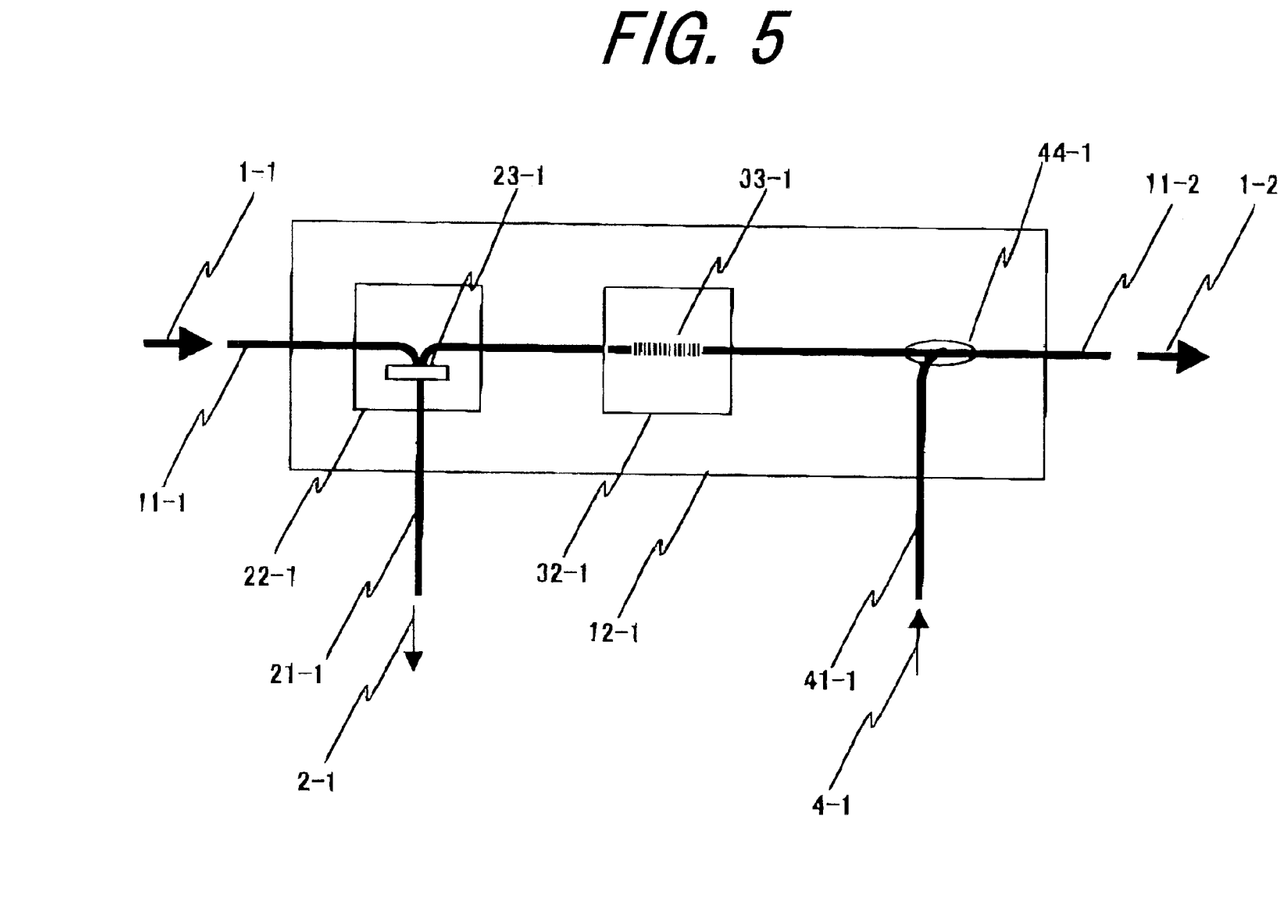
FIG. 5 is a constitutional view of a signal optical add/drop multiplexer having a signal add/drop of high demultiplexed light leakage rejection and optical signal multiplexing constitution by an optical coupler.

FIG. 5 shows a constitution of an add/drop multiplexer comprising a demultiplexing part of one wavelength and an optical coupler. An optical signal 1-1 subjected to wavelength multiplexing is multiplexed for optical signals of specific wavelength at a optical drop unit (wavelength demultiplexer) 22-1 comprising a dielectric multiplexing film filter 23-1. Optical signals of other wavelengths pass through the optical drop unit (wavelength demultiplexer) 22-1 and are incident on a demultiplexed light leakage rejection part 32-1 comprising a fiber bragg grating 33-1 for rejecting light of wavelength of demultiplexed light not less than 30 dB. So, other wavelength optical signals merely receive damping not more than 1 dB, but leakage of demultiplexed light damps not less than 30 dB. The leakage of demultiplexed light into the fiber bragg grating 33-1 at the previous optical drop unit (wavelength demultiplexer) 22-1 is rejected not less than 10 dB, and not less than 40 dB in total is rejected. In the present embodiment, the multiplexing part has the same wavelength as the demultiplexed light using an optical coupler 44-1, but a separate signal light is multiplexed. At this time, An optical level of an output part 11-2 of the optical coupler 44-1 is set so that the multiplexing light is the same as the pass-through light in an average level. The insertion by the optical coupler has merits that the cost is low and setting of wavelength in the multiplexing part is unnecessary and operation is done easily. However, since there is no function of a filter, when the shield characteristics of demultiplexed light is poor, there possibly leads to deterioration of signal quality caused by a coherent cross talk. When the constitution of the present invention is applied, the leakage of demultiplexed light is shielded not less than 40 dB, and even in the constitution using an optical coupler, it is possible to avoid the influence of a coherent cross talk.

While here, demultiplexing/multiplexing of one wavelength has been shown, an add/drop multiplexer of two wavelengths can be constituted by inserting a demultiplexing part of a separate wavelength and a rejection part into a pass-through fiber subsequent to the first wavelength and using 3 inputs in an optical coupler. The constitution for a plurality of wavelengths can also be realized in a similar way described above.

What is claimed is:

1. In an add/drop multiplexing constitution in which a dielectric multilayer film filter comprising a multilayer film having dielectric materials of different refractive index laminated is used as a wavelength filter for demultiplexing a first specific wavelength out of a plurality of wavelength signals, and a dielectric multilayer film filter of different refractive index is used as a wavelength filter for superposing insert signal light of the first specific wavelength on other pass-through light signal, a wavelength add/drop multiplexer, characterized in that a fiber bragg grating for rejecting a leakage of wavelength light to be demultiplexed or multiplexed is inserted between said demultiplexing wavelength filter and the multiplexing wavelength filter.

2. An optical wavelength multiplexing network, using a wavelength add/drop multiplexer, for multiplexing optical signals of at least two or more different wavelengths through an optical fiber transmission path between at least two spots or more to transmit/receive the optical signals, in an add/drop multiplexing constitution, for a signal light add/drop multiplexer, in which a dielectric multilayer film filter comprising a multilayer film having dielectric materials of different refractive index laminated is used as a wavelength filter for demultiplexing a first specific wavelength out of a plurality of wavelength signals transmitted from a spot, and a dielectric multilayer film filter of different refractive index is used as a wavelength filter for superposing an insert signal light of the first specific wavelength on other pass-through light signal, characterized in that a fiber bragg grating for rejecting a leakage of wavelength light to be demultiplexed or multiplexed is inserted between said demultiplexing wavelength filter and the multiplexing wavelength filter.

3. A optical drop unit characterized in that a dielectric multilayer film filter comprising a multilayer film having dielectric materials of different refractive index laminated is used as a wavelength filter for demultiplexing a first specific wavelength out of a plurality of wavelength signals, and a fiber bragg grating wavelength filter for rejecting a leakage of wavelength light to be demultiplexed is inserted into a port for causing optical signals other than a wavelength to be demultiplexed to pass.

* * * * *

UNITED STATES PATENT AND TRADEMARK OFFICE
CERTIFICATE OF CORRECTION

PATENT NO.     : 6,611,638 B2
DATED          : August 26, 2003
INVENTOR(S)    : Shinji Sakano It is certified that error appears in the above-identified patent and that said Letters Patent is hereby corrected as shown below:

<u>Title page,</u>
Insert item:
-- [30] Foreign Application Priority Data
Jan. 16, 2001 [JP]  Japan……………….2001-007206 --

Signed and Sealed this

Sixteenth Day of December, 2003

JAMES E. ROGAN
*Director of the United States Patent and Trademark Office*